US009762328B2

(12) United States Patent
Taira

(10) Patent No.: US 9,762,328 B2
(45) Date of Patent: Sep. 12, 2017

(54) OPTICAL COMMUNICATION MODULE

(71) Applicant: International Business Machines Corporation, Armonk, NY (US)

(72) Inventor: Yoichi Taira, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/950,146

(22) Filed: Nov. 24, 2015

(65) Prior Publication Data

US 2016/0149644 A1    May 26, 2016

(30) Foreign Application Priority Data

Nov. 25, 2014 (JP) ................................. 2014-237251

(51) Int. Cl.
| | |
|---|---|
| H04B 10/00 | (2013.01) |
| H04B 10/40 | (2013.01) |
| H04B 10/50 | (2013.01) |
| G02B 6/00 | (2006.01) |

(52) U.S. Cl.
CPC ............. *H04B 10/40* (2013.01); *G02B 6/00* (2013.01); *H04B 10/502* (2013.01)

(58) Field of Classification Search
CPC .... H04B 10/40; H04B 10/503; H04B 10/502; H04B 10/506; H04B 10/501; H04B 10/2504; H04B 10/071; H04J 14/02; G02B 6/00; G02B 6/4214; G02B 6/3518; G02B 6/428

USPC ................. 398/135–139, 164, 212
See application file for complete search history.

(56) References Cited

U.S. PATENT DOCUMENTS

| 5,912,751 | A | * | 6/1999 | Ford | ................ H04B 10/506 398/139 |
|---|---|---|---|---|---|
| 6,023,361 | A | * | 2/2000 | Ford | ................ H04B 10/506 398/135 |
| 6,992,748 | B2 | * | 1/2006 | Koh | .................... G02F 1/13471 349/196 |
| 7,068,871 | B2 | * | 6/2006 | Sugama | ............. G02B 6/12002 385/14 |

(Continued)

FOREIGN PATENT DOCUMENTS

| JP | 2007264033 A | 10/2007 |
|---|---|---|
| JP | 2012088634 A | 5/2012 |

*Primary Examiner* — Hibret Woldekidan
(74) *Attorney, Agent, or Firm* — Rabin Bhattacharya

(57) ABSTRACT

Optical communication module. The optical communication module includes an optical-connector input and output unit that is provided on a first face of a substrate, the optical-connector input and output unit including a first light reflection member which is arranged at each of N grid points and which reflects incident light at a right angle; an optical-device optical input and output unit that is provided in adjacent to the optical-connector input and output on the first face of the substrate including N second light reflection members which are arranged in a linear manner with spaces therebetween; a plurality of optical waveguides that are provided on the first face of the substrate; and an optical device that is provided on a second face of the substrate, the optical device including N light-receiving units or N light-emitting units which are aligned with N light transmission units of the substrate.

17 Claims, 5 Drawing Sheets

(56) References Cited

U.S. PATENT DOCUMENTS

| | | | | |
|---|---|---|---|---|
| 7,164,814 | B2* | 1/2007 | Ohtsu | G02B 6/138 |
| | | | | 385/129 |
| 7,215,852 | B2* | 5/2007 | Doerr | G02B 6/12011 |
| | | | | 385/39 |
| 7,532,782 | B2* | 5/2009 | Bragg | G02B 6/3608 |
| | | | | 385/129 |
| 7,567,736 | B2* | 7/2009 | Ishikawa | G02B 6/12011 |
| | | | | 385/1 |
| 8,094,979 | B2* | 1/2012 | Safrani | G02F 1/31 |
| | | | | 385/11 |
| 8,229,258 | B2* | 7/2012 | Ishikawa | G02F 1/31 |
| | | | | 385/11 |
| 8,837,878 | B2* | 9/2014 | Chen | G02B 6/30 |
| | | | | 216/24 |
| 2006/0045418 | A1* | 3/2006 | Cho | G02B 6/06 |
| | | | | 385/31 |
| 2007/0237449 | A1* | 10/2007 | Aoki | G02B 6/4292 |
| | | | | 385/14 |
| 2009/0080830 | A1* | 3/2009 | Matsuoka | G02B 6/43 |
| | | | | 385/14 |
| 2009/0226137 | A1* | 9/2009 | Abel | G02B 6/2817 |
| | | | | 385/71 |
| 2014/0153881 | A1* | 6/2014 | Liff | G02B 6/4214 |
| | | | | 385/89 |
| 2015/0117824 | A1* | 4/2015 | Wang | G02B 6/32 |
| | | | | 385/93 |
| 2015/0316724 | A1* | 11/2015 | Wang | G02B 6/32 |
| | | | | 385/14 |

* cited by examiner

OPTICAL COMMUNICATION MODULE

CROSS-REFERENCE TO RELATED APPLICATION

This application claims the benefit of priority from Japanese Patent Application No. 2014-237251, filed Nov. 25, 2014, the contents of which are incorporated herein by reference.

FIELD OF THE INVENTION

The present invention relates to an optical communication module, and more specifically, to an arrangement of an optical device, an optical connector, an optical waveguide, and the like in an optical communication module, such as an optical transceiver.

BACKGROUND

Optical interconnect technologies have been becoming essential as one type of signal I/O for computers. In such a case, it is important to achieve a required bandwidth (the number of channels) with a small size and low cost. For this purpose, an optical transceiver needs to be small in size with high integration.

In the case where an optical transceiver has a configuration including four units, that is, a light-emitting device such as a laser diode (LD), a driving circuit for the LD, a light-receiving device such as a photodiode (PD), and an amplifying circuit for the PD, the simplest use of the optical transceiver can be achieved when the light-emitting device and the light-receiving device are arranged one-dimensionally. In addition, with this one-dimensional arrangement, electrical connection of the driving circuit and the amplifying circuit can be achieved easily. However, in the case of conventional optical transceivers, in a light-emitting device and a light-receiving device, a connection point of an electrical signal and an optical signal is present on the same face, and the connection points need to be spatially separated between the devices. Therefore, it has been difficult to increase the one-dimensional linear density of the devices. Meanwhile, when a driving circuit and an amplifying circuit are arranged to be elongated circuits which are modularized for each channel, the most effective signal input and output can be achieved. Under such circumstances, in order to increase the number of channels of an optical transceiver, it is required for the optical transceiver to be configured such that a plurality of light-emitting devices, a plurality of driving circuits for the light-emitting devices, a plurality of light-receiving devices, and a plurality of amplifying circuits for the light-receiving devices which are modularized and have a plurality of channels are mounted.

SUMMARY OF THE INVENTION

According to an aspect of the present invention, an optical communication module is provided. The optical communication module includes: (a) an optical-connector optical input and output unit that is provided on a first face of a substrate, the optical-connector optical input and output unit including a first light reflection member which is arranged at each of N grid points and which reflects incident light at a right angle; (b) an optical-device optical input and output unit that is provided in adjacent to the optical-connector optical input and output unit on the first face of the substrate, the optical-device optical input and output unit including N second light reflection members which are arranged in a linear manner with spaces therebetween, the spaces being the same as grid point spaces between the N grid points of the optical-connector optical input and output unit, and which reflect incident light at a right angle; (c) a plurality of optical waveguides that are provided on the first face of the substrate, the plurality of optical waveguides connecting the first light reflection members of the optical-connector optical input and output unit and the second light reflection members in a one-to-one correspondence relationship, the plurality of optical waveguides being arranged in parallel to one another with regular spaces therebetween; and (d) an optical device that is provided on a second face of the substrate, the optical device including N light-receiving units or N light-emitting units which are aligned with N light transmission units of the substrate provided below the corresponding second light reflection members of the optical-device optical input and output unit.

According to an aspect of the invention, an optical transceiver is provided. The optical transceiver includes: (a) an optical-connector optical input and output unit that is provided on a first face of a substrate, the optical-connector optical input and output unit including a first light reflection member which is arranged at each of 2N grid points and which reflects incident light at a right angle; (b) a first optical input unit that is provided in adjacent to the optical-connector optical input and output unit on the first face of the substrate, the first optical input unit including N second light reflection members which are arranged in a linear manner with spaces therebetween, the spaces being the same as grid point spaces of the 2N grid points of the optical-connector optical input and output unit, and which reflect incident light at a right angle; (c) a second optical output unit that is provided in adjacent to the optical-connector optical input and output unit on the first face of the substrate, the second optical output unit including N third light reflection members which are arranged in a linear manner with spaces therebetween, the spaces being the same as the grid point spaces of the 2N grid points of the optical-connector optical input and output unit, and which reflect incident light at a right angle; (d) a plurality of first optical waveguides that are provided on the first face of the substrate, the plurality of first optical waveguides connecting the first light reflection members of the optical-connector optical input and output unit and the second light reflection members in a one-to-one correspondence relationship, the plurality of first optical waveguides being arranged in parallel to one another with regular spaces therebetween; (e) a plurality of second optical waveguides that are provided on the first face of the substrate, the plurality of second optical waveguides connecting the first light reflection members of the optical-connector optical input and output unit and the third light reflection members in a one-to-one correspondence relationship, the plurality of second optical waveguides being arranged in parallel to one another with regular spaces therebetween; (f) a light-receiving device that is provided on a second face of the substrate, the light-receiving device including N light-receiving units which are aligned with N first light transmission units of the substrate provided below the corresponding second light reflection members of the first optical input unit; and (g) a light-emitting device that is provided on the second face of the substrate, the light-emitting device including N light-emitting units which are aligned with N second light transmission units of the substrate provided below the corresponding third light reflection members of the second optical output unit.

DETAILED DESCRIPTION OF THE PREFERRED EMBODIMENTS

Embodiments of the present invention will be described with reference to drawings. In an embodiment described below, an example of an optical transceiver as an optical communication module including a light-emitting device and a light-receiving device will be described. However, the present invention is not limited to this and can include other embodiments, for example, a configuration including only a light-emitting device and a configuration including only a light-receiving device as an optical communication module. Furthermore, devices of any type can be used as a light-emitting device and a light-receiving device used for an optical communication module, as long as the devices are able to transmit light via optical waveguides on a substrate.

The object of the present invention is to provide an optical communication module such as a high-density optical transceiver capable of supporting multiple channels, and more specifically, to provide a new arrangement/configuration of an optical device, an optical connector, an optical waveguide, and the like for achieving the high-density optical communication module. The optical waveguides and the optical device are arranged on different faces of the substrate, and the optical waveguides which allow optical connection between the optical-device optical input and output unit and the optical-connector optical input and output unit using multiple channels are arranged on a single face. Therefore, a high-density optical communication module using multiple channels can be obtained.

The first and second optical waveguides and the light-receiving and light-emitting devices are arranged on different faces of the substrate. The first and second optical waveguides which allow optical connection between the optical input and output units for the light-receiving and light-emitting devices and the optical-connector optical input and output unit using multiple channels are arranged on a single face. Therefore, a high-density optical transceiver using multiple channels can be obtained.

Figure 1:
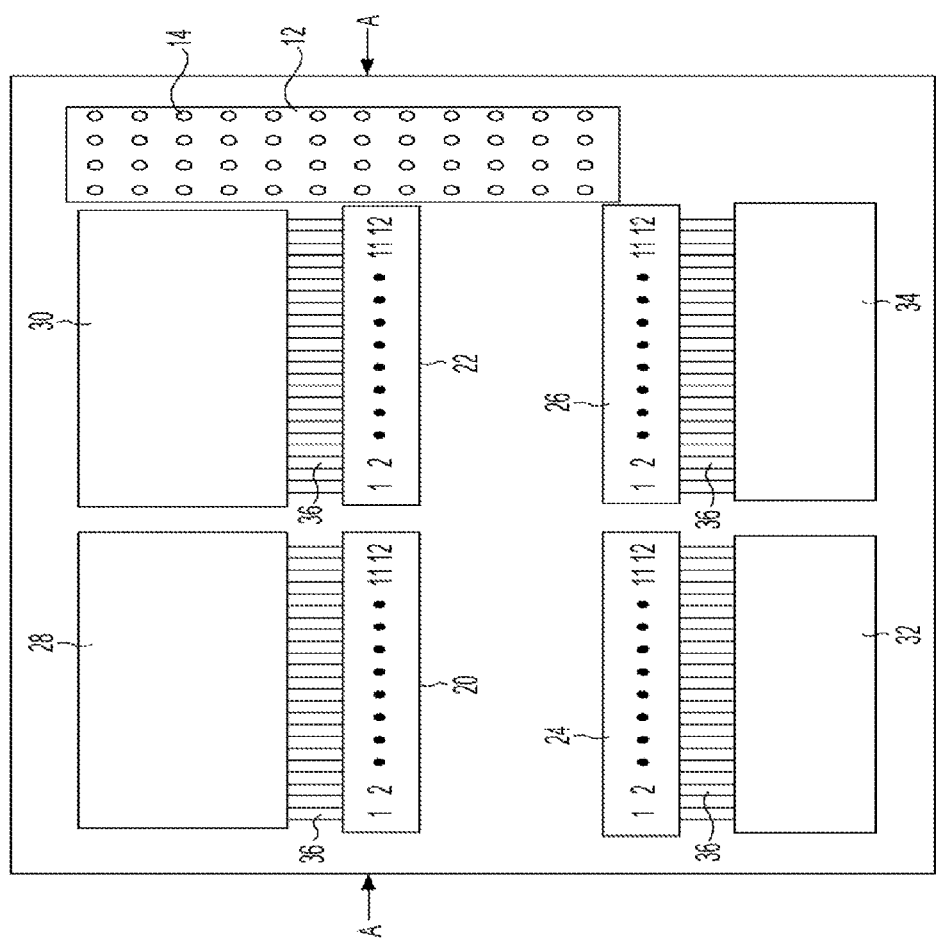
FIG. 1 is a plan view illustrating a configuration of an optical transceiver according to an embodiment of the present invention.
Figure 2:
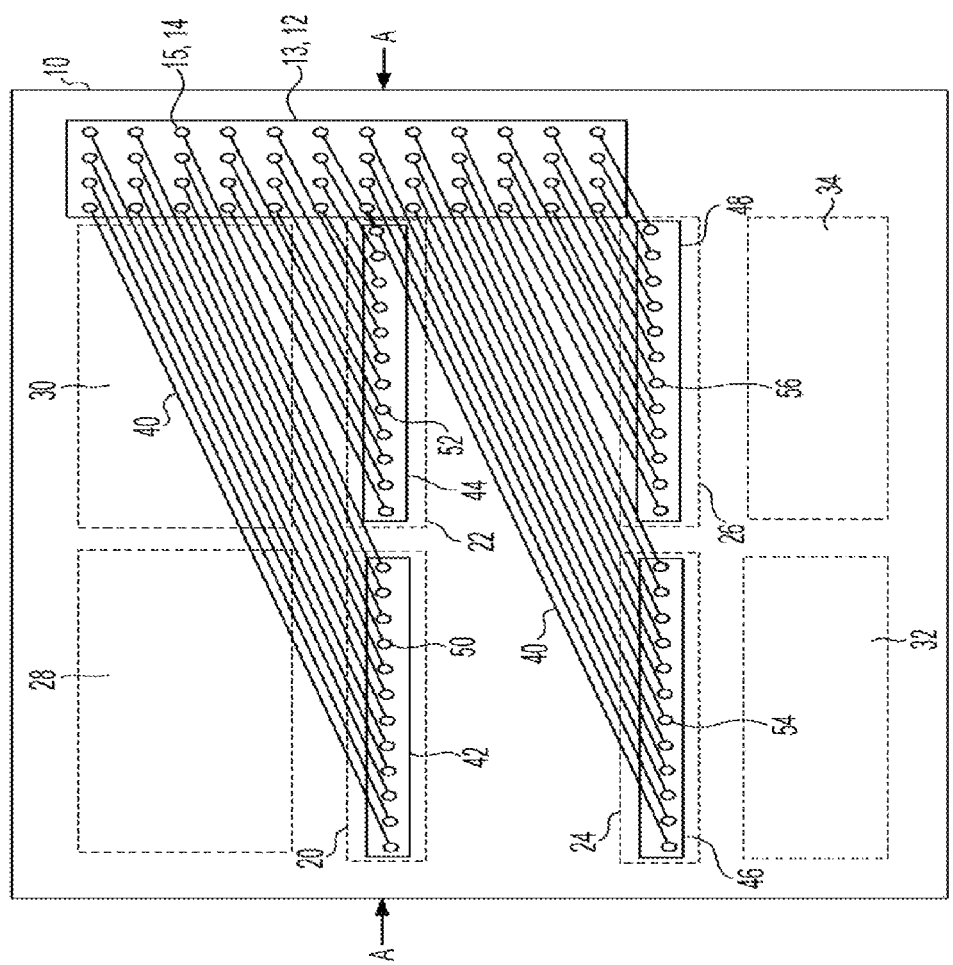
FIG. 2 is a plan view illustrating a configuration of an optical transceiver according to an embodiment of the present invention.
Figure 3:
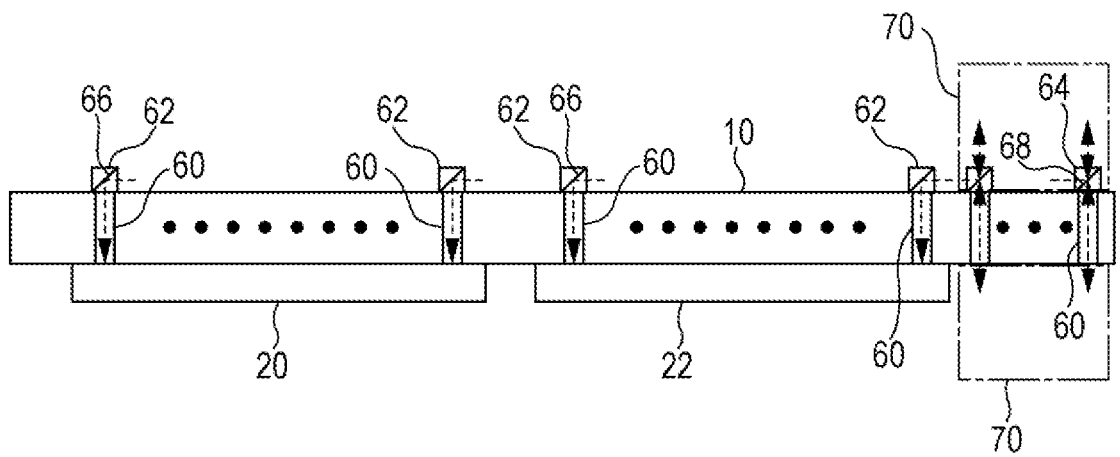
FIG. 3 is a cross-section view of a configuration of an optical transceiver according to an embodiment of the present invention.

FIGS. 1 and 2 are plan views illustrating a configuration of an optical transceiver according to an embodiment of the present invention. FIG. 1 illustrates a configuration of a second face (hereinafter, simply referred to as a "front face") of an optical transceiver 100. FIG. 2 illustrates a configuration of a first face (hereinafter, simply referred to as a "rear face") that is opposite (on the rear side of) the second face of the optical transceiver 100. FIG. 3 is a cross-section view illustrating a configuration of a transceiver according to an embodiment of the present invention. Hereinafter, a configuration of the optical transceiver 100 according to an embodiment of the present invention will be described with reference to FIGS. 1 to 3.

The optical transceiver 100 of FIG. 1 includes an optical-connector optical input and output unit 12, two light-receiving devices 20 and 22, two light-emitting devices 24 and 26, amplifying circuits (amplifiers) 28 and 30 for the light-receiving devices, and driving circuits (drivers) 32 and 34 for the light-emitting devices, all of which are provided on the front face of a substrate 10. The optical-connector optical input and output unit 12 is arranged substantially perpendicular to a horizontal (lateral) direction of the substrate 10. The two light-receiving devices 20 and 22 and the two light-emitting devices 24 and 26 are arranged substantially in parallel to each other in the vicinity of (in adjacent to) the optical-connector optical input and output unit 12.

The light-receiving devices 20 and 22 are electrically connected to the amplifying circuits 28 and 30, respectively, via wires 36. Similarly, the light-emitting devices 24 and 26 are electrically connected to the driving circuits 32 and 34, respectively, via the wires 36. The light-receiving devices 20 and 22 and the light-emitting devices 24 and 26 can be arranged upside down with respect to the arrangement illustrated in FIG. 1. Furthermore, the light-emitting device 24 (26) can be arranged in adjacent to the light-receiving device 20 (22).

For example, photodiodes (PDs) including light-receiving units which are arranged in an array (in a linear manner) can be used as the light-receiving devices 20 and 22. For example, laser diodes (LDs) such as vertical cavity surface emitting lasers (VCSELs) can be used as the light-emitting devices 24 and 26. In the description provided below, either one of or both of a light-receiving device and a light-emitting device can be collectively referred to as an optical device.

The optical-connector optical input and output unit 12 of FIG. 1 has 48 (=4×12) quadrate grid points 14. A through-hole (opening) which allows light to transmit between the front face and the rear face of the substrate is provided at each of the grid points 14. Instead of the through-holes, a transparent member through which light is transmitted can be provided at each of the grid points 14 or a single transparent member can be provided for the entire grid points 14.

The optical devices 20, 22, 24, and 26 of FIG. 1 each include optical input and output units (points) for channels (Chs) 1 to 12 that are arranged in a line in the lateral (horizontal) direction. The number of channels (Chs) of the optical devices 20, 22, 24, and 26 can be increased or decreased in accordance with the number of grid points (the number of Chs) of the optical-connector optical input and output unit 12. In the example of FIG. 1, each of the four optical devices includes optical input and output units for 12 Chs, and the optical-connector optical input and output unit 12 has at least 48 grid points (Chs) accordingly. In this case, the optical transceiver 100 is configured to be an optical transceiver that is capable of optical communication using at most 48 Chs.

On the rear face of the substrate 10 in FIG. 2, an optical-connector optical input and output unit 13, optical-device optical input and output units 42, 44, 46, and 48, and a plurality of optical waveguides 40 are provided. The optical-connector optical input and output unit 13 corresponds to the optical-connector optical input and output unit 12 of FIG. 1. The optical-device optical input and output units 42, 44, 46, and 48 correspond to the light-receiving device 20, the light-receiving device 22, the light-emitting device 24, and the light-emitting device 26, respectively, of FIG. 1. The plurality of optical waveguides 40 are provided between the optical-connector optical input and output unit 13 and the optical-device optical input and output units 42, 44, 46, and 48. In FIG. 2, the optical waveguides 40 are provided for individual channels, and the number of optical waveguides 40 is 48, which is equal to the total number of channels (Chs). In FIG. 2, the component parts including the light-receiving device 20 and the like of FIG. 1 are illustrated in regions surrounded by broken lines with the same signs.

The optical-connector optical input and output unit 13 of FIG. 2 has 48 grid points 15, which correspond to the 48 grid points 14 of the optical-connector optical input and output unit 12 of FIG. 1. At each of the grid points 15, a light reflection member which reflects, at substantially a right angle, light which is incident through the connected optical waveguide 40 or light which is incident from outside via the optical connector is provided. The optical-device optical input and output units 42, 44, 46, and 48 each include 12 light reflection members which are arranged in a linear manner in the lateral (horizontal) direction at optical input and output points 50, 52, 54, and 56, respectively. The light reflection members are provided to reflect, at substantially a right angle, light from the optical waveguides 40 or light from the optical device, as described later.

At each of the optical input and output points 50, 52, 54, and 56, a through-hole (opening) which allows light to transmit between the front face and the rear face of the substrate is provided. The optical devices and the optical waveguides are optically connected via the through-holes and the reflection members mentioned above. This optical connection will be described in detail later with reference to FIG. 3. Instead of the through-holes, a transparent member through which light is transmitted can be provided at each of the optical input and output points 50, 52, 54, and 56 or a transparent member can be provided for each of the optical-device optical input and output units 42, 44, 46, and 48.

Each of the 48 optical waveguides 40 is arranged, as illustrated in FIG. 2, in such a manner that the light reflection member of one grid point 15 of the optical-connector optical input and output unit 13 and the light reflection member of a corresponding optical input and output point of one of the optical-device optical input and output units 42, 44, 46, and 48 are connected in a one-to-one correspondence relationship. The 48 optical waveguides 40 are arranged in parallel with specific spaces therebetween. One optical waveguide 40 corresponds to one channel, and optical signals for individual channels are transmitted within the optical waveguides 40 separately from one another.

FIG. 3 is a cross-section view of the optical transceiver 100 of FIGS. 1 and 2 taken along the line A-A of the plan views. For a convenience of explanation, in FIG. 3, the "front face" of the substrate 10 illustrated in FIGS. 1 and 2 is illustrated in a lower side and the "rear face" is illustrated in an upper side. For example, any circuit board such as a printed circuit board or a multilayer wiring board can be used as the substrate 10. On the front face on the lower side of the substrate 10, the light-receiving devices 20 and 22 are arranged. At the positions for channels 1 to 12 of the light-receiving devices 20 and 22, through-holes 60 are provided. As described above, instead of the through-holes, transparent members can be provided.

On the rear face on the upper side of the substrate 10, light reflection members 62 are provided at optical input and output points above the through-holes 60 for the individual channels of the light-receiving devices. The light reflection members 62 are formed of, for example, 90-degree polarization structures such as 45-degree mirrors. Incident light from the optical waveguides 40 is bent at a right angle by the light reflection members 62, passes through the through-holes, and enters the light-receiving units of the light-receiving device 20 (22). In the case of the light-emitting devices 24 and 26, emission light from the light-receiving devices passes through the through-holes, is bent at a right angle by the light reflection members 62, and is guided to the optical waveguides 40. In FIG. 3, propagation of light is represented by broken-line arrows.

The broken lines 70 on the right end of FIG. 3 indicate an optical connector which is connected to the front face or the rear face of the substrate 10. The optical connector can be selectively connected to the front face or the rear face of the substrate 10. At each of grid points 64 of the optical-connector optical input and output unit 13 (FIG. 2) which receives an optical connector, a light reflection member 68 is provided. As described above, the light reflection members 68 reflect light which is incident through the connected optical waveguides 40 or light which is incident from outside via the optical connector 70 at substantially a right angle toward above or below the substrate 10. In the optical connector, in order to increase the light coupling efficiency of propagating light, a lens can be provided in the vicinity of a point connected to the substrate for each channel.

Figure 4:
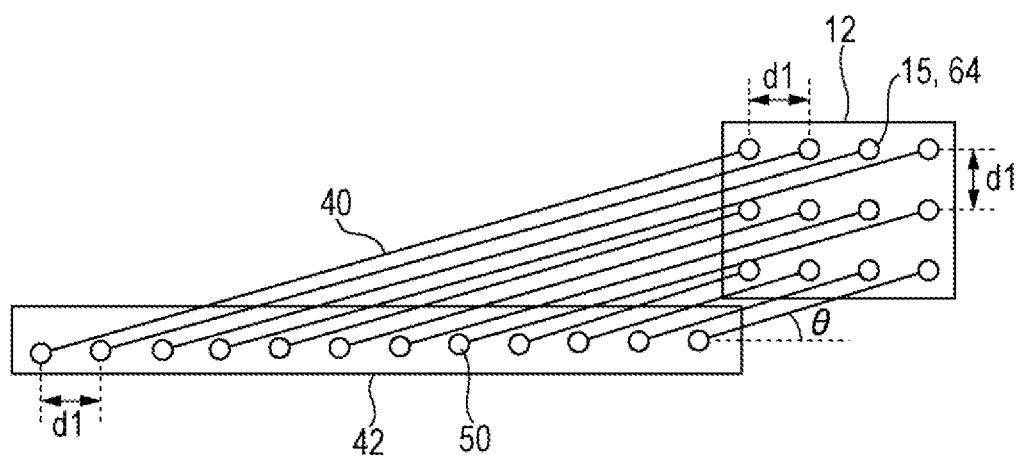
FIG. 4 is a plan view illustrating a basic configuration/arrangement of optical input and output units and optical waveguides according to the present invention.

FIG. 4 is a plan view illustrating a basic configuration/arrangement of optical input and output units and optical waveguides according to an embodiment of the present invention. The optical-device optical input and output unit 42 has the optical input and output points (reflection members) 50 for 12 channels. The optical-connector optical input and output unit 12 has the 12 grid points (light reflection members) 15 in association with the optical input and output points (reflection members) 50 for 12 channels. The space dl between adjoining input and output points (reflection members) 50 is equal to the space dl between adjoining grid points (light reflection members) 15. The number of channels is not limited to 12. Obviously, any number of channels can be used.

One optical input and output point (light reflection member) 50 and one grid point (light reflection member) 15 are connected through an optical waveguide 40. Furthermore, the 12 optical waveguides 40 are arranged to maintain a specific angle θ with respect to the direction (lateral direction) of the optical input and output points (light reflection members) 50 which are arranged in a line. The 12 optical waveguides 40 are parallel to one another and maintain a specific space therebetween. The specific space between the optical waveguides is, for example, 60 micrometers. With this configuration, optical signals for corresponding channels can be transmitted through the optical waveguides without the optical signals being mixed. In order to increase the optical coupling efficiency of the propagating light, a lens or a curved surface mirror can be arranged at the point where the optical waveguides 40 and the optical input and output points (light reflection members) 50 are connected or the point where the optical waveguides 40 and the grid points (light reflection members) 15 are connected.

Figure 5:
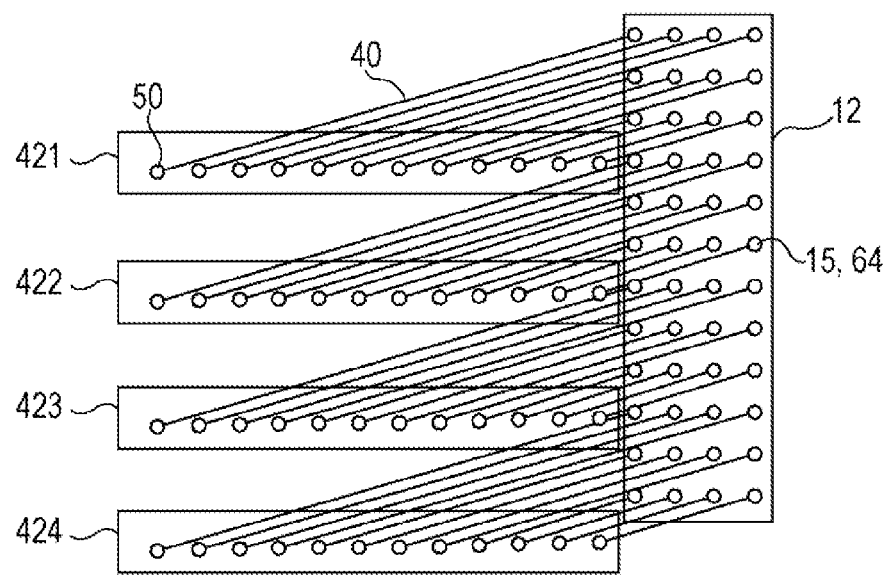
FIG. 5 is a plan view illustrating an arrangement of optical input and output units and optical waveguides according to an embodiment of the present invention.
Figure 6:
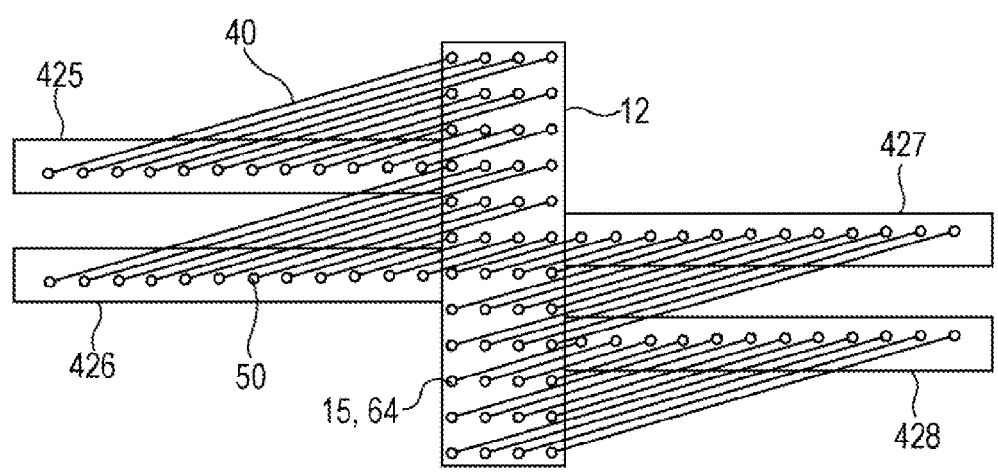
FIG. 6 is a plan view illustrating an arrangement of optical input and output units and optical waveguides according to an embodiment of the present invention.
Figure 7:
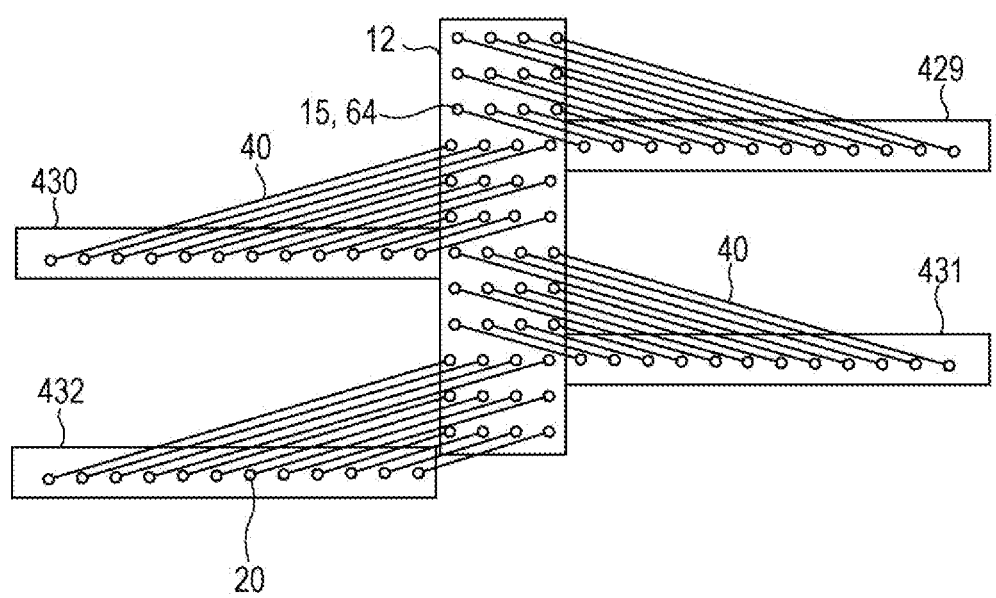
FIG. 7 is a plan view illustrating an arrangement of optical input and output units and optical waveguides according to an embodiment of the present invention.

In general, the specific angle θ of the optical waveguides 40 can be defined as the equation: $\theta = \tan^{-1}(1/N)$, by using the number N of grid points of the optical-connector optical input and output unit 12. In the example of FIG. 3, the number N of grid points is four. By substituting 4 for N in the above equation, the angle θ is defined as about 14 degrees. Optical fibers having a specific core diameter can be used as the optical waveguides 40. The specific core diameter is, for example, 30 micrometers. NA of the optical waveguides 40 can be set to be equal to or greater than NA of optical fibers. Next, configurations/arrangements of optical input and output units and optical waveguides according to modifications of the present invention will be described with reference to FIGS. 5 to 7. FIGS. 5 to 7 are plan views each illustrating an arrangement of optical input and output units and optical waveguides according to an embodiment of the present invention. In FIG. 5, four optical-device optical input and output units 421 to 424 are arranged in parallel with spaces therebetween. The optical-connector optical input and output unit 12 is arranged adjacent on the right side of the four optical-device optical input and output units 421 to 424.

As described above, the optical waveguides 40 are arranged with a specific regularity (with spaces therebetween and in parallel to one another) at positions between the four optical-device optical input and output units 421 to 424 and the optical-connector optical input and output unit 12. Although not illustrated in FIG. 5, the optical-connector optical input and output unit 12 can be arranged adjacent on the left side of the four optical-device optical input and output units 421 to 424. In this case, the optical waveguides 40 are arranged so as to extend leftward in FIG. 5 while maintaining a similar regularity.

FIGS. 6 and 7 each illustrate an arrangement example in which the optical-connector optical input and output unit 12 is arranged between (in the middle of) optical-device optical input and output units which are arranged on the left and right sides. In FIG. 6, two optical-device optical input and output units 425 and 426 which are vertically adjacent to each other are arranged on the left side of the optical-connector optical input and output unit 12, and optical-device optical input and output units 427 and 428 which are vertically adjacent to each other are arranged on the right side of the optical-connector optical input and output unit 12. The optical waveguides 40 are arranged with a specific regularity (spaces therebetween and in parallel to one another) in a similar manner at positions between the four optical-device optical input and output units 425 to 428 and the optical-connector optical input and output unit 12.

FIG. 7 illustrates an arrangement example in which optical-device optical input and output units 429 to 432 are alternately arranged on the left side and right side of the optical-connector optical input and output unit 12, which is arranged at the center. The optical waveguides 40 are arranged with a specific regularity (spaces therebetween and in parallel to one another) in a similar manner. In this case, the arrangement direction of the optical waveguides 40 changes, from the top to the bottom, in the order of the leftward direction, rightward direction, leftward direction, and rightward direction. The arrangement examples illustrated in FIGS. 5 to 7 are merely examples. Obviously, multiple arrangements can be set (selected) as long as the specific regularity regarding the arrangement described above is maintained.

The embodiments of the present invention have been explained above with reference to the drawings. However, the present invention is not limited to the embodiments described above. The present invention can be implemented by making a variety of improvements, corrections, and modifications based on knowledge of those skilled in the art, without departing from the scope of the present invention.

What is claimed is:

1. An optical communication module comprising:
   an optical-connector optical input and output unit that is provided on a first face of a substrate, the optical-connector optical input and output unit including a first light reflection member which is arranged at each of N grid points and which reflects incident light at a right angle;
   an optical-device optical input and output unit that is provided in adjacent to the optical-connector optical input and output unit on the first face of the substrate, the optical-device optical input and output unit including N second light reflection members which are arranged in a linear manner with spaces therebetween, the spaces being the same as grid point spaces between the N grid points of the optical-connector optical input and output unit, and which reflect incident light at a right angle;
   a plurality of optical waveguides that are provided on the first face of the substrate, the plurality of optical waveguides connecting the first light reflection members of the optical-connector optical input and output unit and the second light reflection members in a one-to-one correspondence relationship, the plurality of optical waveguides being arranged in parallel to one another with spaces therebetween; and
   an optical device that is provided on a second face of the substrate, including N light-receiving units or N light-emitting units which are aligned with N light transmission units of the substrate provided below the corresponding second light reflection members of the optical-device optical input and output unit,
   wherein N is an integer value greater than or equal to 1,
   wherein the light transmission unit is selected from the group consisting of a through-hole opening and a transparent member.

2. The optical communication module according to claim 1, wherein:
   the optical-connector optical input and output unit is connected to an optical connector; and
   the reflection light reflecting toward above the first face of the substrate is guided to the optical connector by the first light reflection members.

3. The optical communication module according to claim 1, wherein:
   the optical-connector optical input and output unit guides reflection light to an optical connector connected to the second face of the substrate via N light transmission units of the substrate provided below the corresponding first light reflection members.

4. The optical communication module according to claim 1, wherein:
   an arrangement direction in which the second light reflection members of the optical-device optical input and output unit are arranged in the linear manner is parallel to a horizontal direction of the N grid points of the optical-connector optical input and output unit.

5. The optical communication module according to claim 4, wherein:
the plurality of optical waveguides are arranged at a specific angle with respect to the arrangement direction in which the second light reflection members are arranged in the linear manner.

6. The optical communication module according to claim 1, wherein:
the optical-device optical input and output unit includes a first optical input and output unit and a second optical input and output unit, each of the first optical input and output unit and the second optical input and output unit including (N/2) reflection members; and
the optical-connector optical input and output unit is arranged outward relative to the first optical input and output unit and the second optical input and output unit or in the middle of the first optical input and output unit and the second optical input and output unit on the first face of the substrate.

7. The optical communication module according to claim 1, wherein:
the optical device that is provided on a second face of the substrate includes at least one of a light-receiving device and a light-emitting device.

8. The optical communication module according to claim 6, wherein:
the first optical input and output unit is an optical input unit for a light-receiving device; and
the second optical input and output unit is an optical output unit for a light-emitting device.

9. The optical communication module according to claim 1, wherein:
N light transmission units of the substrate include a member transparent to light to the N light-receiving units or light from the N light-emitting units or include N opening parts.

10. An optical transceiver comprising:
an optical-connector optical input and output unit that is provided on a first face of a substrate, the optical-connector optical input and output unit including a first light reflection member which is arranged at each of 2N grid points and which reflects incident light at a right angle;
a first optical input unit that is provided in adjacent to the optical-connector optical input and output unit on the first face of the substrate, the first optical input unit including N second light reflection members which are arranged in a linear manner with spaces therebetween, the spaces being the same as grid point spaces of the 2N grid points of the optical-connector optical input and output unit, and which reflect incident light at a right angle;
a second optical output unit that is provided in adjacent to the optical-connector optical input and output unit on the first face of the substrate, the second optical output unit including N third light reflection members which are arranged in a linear manner with spaces therebetween, the spaces being the same as the grid point spaces of the 2N grid points of the optical-connector optical input and output unit, and which reflect incident light at a right angle;
a plurality of first optical waveguides that are provided on the first face of the substrate, the plurality of first optical waveguides connecting the first light reflection members of the optical-connector optical input and output unit and the second light reflection members in a one-to-one correspondence relationship, the plurality of first optical waveguides being arranged in parallel to one another with spaces therebetween;
a plurality of second optical waveguides that are provided on the first face of the substrate, the plurality of second optical waveguides connecting the first light reflection members of the optical-connector optical input and output unit and the third light reflection members in a one-to-one correspondence relationship, the plurality of second optical waveguides being arranged in parallel to one another with regular spaces therebetween;
a light-receiving device that is provided on a second face of the substrate, the light-receiving device including N light-receiving units which are aligned with N first light transmission units of the substrate provided below the corresponding second light reflection members of the first optical input unit; and
a light-emitting device that is provided on the second face of the substrate, the light-emitting device including N light-emitting units which are aligned with N second light transmission units of the substrate provided below the corresponding third light reflection members of the second optical output unit,
wherein N is an integer value greater than or equal to 1,
wherein the light transmission unit is selected from the group consisting of a through-hole opening and a transparent member.

11. The optical transceiver according to claim 10, wherein:
the optical-connector optical input and output unit is connected to an optical connector; and
the reflection light reflecting toward above the first face of the substrate is guided to the optical connector by the first light reflection members.

12. The optical transceiver according to claim 10, wherein:
the optical-connector optical input and output unit guides reflection light to an optical connector connected to the second face of the substrate via 2N opening parts of the substrate provided below the corresponding first light reflection members.

13. The optical transceiver according to claim 10, wherein:
an arrangement direction in which the second light reflection members of the first optical input unit are arranged in the linear manner; and
an arrangement direction in which the third light reflection members of the second optical output unit are arranged in the linear manner are each parallel to a horizontal direction of the 2N grid points of the optical-connector optical input and output unit.

14. The optical transceiver according to claim 13, wherein:
the plurality of first optical waveguides and the plurality of second optical waveguides are arranged at a specific angle with respect to the arrangement direction in which the second light reflection members of the first optical input unit are arranged in the linear manner; and
the arrangement direction in which the third light reflection members of the second optical output unit are arranged in the linear manner.

15. The optical transceiver according to claim 10, wherein:
the optical-connector optical input and output unit is arranged outward relative to the first optical input unit and the second optical output unit or in the middle of the first optical input unit and the second optical output unit on the first face of the substrate.

16. The optical transceiver according to claim 10, wherein:
the N first light transmission units and the N second light transmission units of the substrate include a member transparent to light to the N light-receiving units and a member transparent to light from the N light-emitting units or include N opening parts.

17. The optical transceiver according to claim 10, further comprising:
an amplifying circuit that is electrically connected to the light-receiving device, the amplifying circuit being provided on the second face of the substrate; and
a driving circuit that is electrically connected to the light-emitting device, the driving circuit being provided on the second face of the substrate.

* * * * *